United States Patent [19]

Reynolds

[11] Patent Number: 5,421,168
[45] Date of Patent: Jun. 6, 1995

[54] FOOD PRODUCT FREEZER SYSTEM

[76] Inventor: Martin M. Reynolds, 16809 N. 59th St., Scottsdale, Ariz. 55254

[21] Appl. No.: 207,019

[22] Filed: Mar. 4, 1994

[51] Int. Cl.$^6$ .............................................. F25D 13/06
[52] U.S. Cl. ........................................ 62/63; 62/332; 62/374; 62/381
[58] Field of Search .................... 62/63, 374, 332, 346, 62/381

[56] References Cited

U.S. PATENT DOCUMENTS

| | | | |
|---|---|---|---|
| 944,625 | 12/1909 | Milburn . | |
| 2,749,722 | 6/1956 | Knowles | 62/106 |
| 3,048,987 | 8/1962 | Wentworth | 62/346 |
| 3,152,453 | 10/1964 | Hamilton | 62/71 |
| 3,774,409 | 11/1973 | Persson et al. | 52/320 |
| 4,098,095 | 7/1978 | Roth | 62/346 |
| 4,138,768 | 2/1979 | Roth | 17/32 |
| 4,192,899 | 3/1980 | Roth | 426/513 |
| 4,239,785 | 12/1980 | Roth | 426/266 |
| 4,294,860 | 10/1981 | Roth | 426/417 |
| 4,337,627 | 7/1982 | Roth | 62/346 |
| 4,349,575 | 9/1982 | Roth | 426/513 |
| 4,446,159 | 5/1984 | Roth | 426/249 |
| 4,450,183 | 5/1984 | Steinberg et al. | 426/646 |
| 4,456,624 | 6/1984 | Glantz et al. | 426/96 |
| 4,478,861 | 10/1984 | Montgomery et al. | 426/295 |
| 4,567,050 | 1/1986 | Roth | 426/417 |
| 4,804,551 | 2/1989 | Mathews et al. | 426/518 |
| 4,856,285 | 8/1989 | Acharya et al. | 62/332 |
| 4,858,445 | 8/1989 | Rasovich | 62/332 |
| 4,914,927 | 9/1990 | Miller et al. | 62/381 |
| 4,934,928 | 6/1990 | Akamatsu | 432/59 |
| 5,156,006 | 10/1992 | Broderdorf et al. | 62/46.1 |
| 5,187,947 | 2/1993 | Breunig et al. | 62/346 |

FOREIGN PATENT DOCUMENTS 1233011 10/1960 France .

OTHER PUBLICATIONS

Rota–Freeze 1QF In–Line System–Drum Freezer Type H 1200 Basic, Atlas Denmark.
GMF Gouda Drum Flakers, Doudsche Machinefabriek B.V., Kattensingel 21, 2801 CA Gouda, Holland.
Reno Technology, P.O. Box 1570, Hutchinson, Kansas 67504-1570.
Parken et al., "Heat Transfer Through Falling Film Evaporation and Boiling On Horizontal Tubes", Transactions of the ASME, vol. 112, Aug. 1990, pp. 744–750.
GYRoCOMPACT M76–Modular Spiral Belt Freezers, AGA Frigoscandia Food Products Systems.
Freeze Wheel System–Questions and Answers.
Reno Technology, "New Name For US. New Technology For You".

*Primary Examiner*—Ronald C. Capossela
*Attorney, Agent, or Firm*—Sheridan Ross & McIntosh

[57] ABSTRACT

A freezer system which partially freezes food products through conductive heat transfer with rotating contact freezers prior to complete freezing of the food products in an enclosed convection freezer. Food products sequentially contact outer surfaces of two rotating contact freezers, which partially freezes the food products to first and second predetermined depths. The partially frozen food products then enter an enclosed convection freezer for complete freezing. Partial freezing of the food products prior to a complete freeze of the food products provides for a greatly increased rate of production of high quality frozen food products.

15 Claims, 3 Drawing Sheets

5,421,168

FOOD PRODUCT FREEZER SYSTEM

FIELD OF THE INVENTION

The present invention generally relates to a freezing system for food products, and more particularly, to an improved system which increases product throughput, enhances product flavor and integrity, reduces product dehydration and weight loss and, at the same time, reduces space and cooling requirements.

BACKGROUND OF THE INVENTION

While production techniques and markets for frozen food products are well developed, important advances continue to be made. In particular, continuing developments are directed to further preserving the flavor, and maintaining the moisture, appearance and integrity of frozen food products.

For example, cryogenic freezing, which involves a very fast, low-temperature freeze of a food product, is being perfected to yield products which are less dehydrated and more tender, and which exhibit less shrinkage. Further, such freezing yields effective pasteurization, i.e., rendering bacteria dead or inactive, as evidenced by a greatly reduced plate count, e.g. 80% to 98% reduction, thereby resulting in longer shelf lives and overall increased product integrity.

With the continuing development of such techniques, consumer demand for products continues to increase. Consequently, freezer system throughput and attendant space requirements have become particularly acute design considerations for established production facilities. That is, since the facilities necessary to produce frozen food products are typically capital intensive, the general objective among food producers is to accommodate the implementation of new developments within the limitations of their existing facilities. This objective, in turn, puts a premium upon approaches for implementing new technologies which will also increase throughput and maintain or reduce space requirements.

Most recently, in an attempt to address at least some of the above-noted considerations, a tunnel-spiral freezer system was developed. The food product is initially crust frozen in a liquid nitrogen tunnel and then frozen completely in a spiral freezer. Crust freezing the food product inhibits dehydration of the food product, thereby allowing the food products to be placed in contact with one another as the food products are completely frozen. However, the tunnel-spiral freezer presents certain drawbacks.

Specifically, if liquid nitrogen is used in the tunnel portion, gaseous bubbles of vapor can form on the lower side of the food product as it travels through the liquid nitrogen bath due to the heat transfer from the food product to the liquid nitrogen. These bubbles inhibit the crust freezing and the resultant partially frozen food products stick together, or "twin," resulting an unaesthetic appearance. Additionally, the nitrogen tunnel can present safety concerns due to the nitrogen vapor exhaust.

Finally, where a liquid nitrogen tunnel is utilized, significant refrigeration inefficiencies can be experienced due to tunnel energy losses.

SUMMARY OF THE INVENTION

Accordingly, the general object of the present invention is to provide a freezer system which yields improved frozen food products and production efficiencies.

More particularly, an object of the present invention is to provide a freezer system which yields increased throughput.

Another specific object of the present invention is to provide a freezer system which improves the efficiency of refrigeration energy utilization, and in addition, yields space utilization efficiencies.

Another specific object of the present invention is to provide a freezer system which yields a higher quality food product by reducing the effects of dehydration.

Another specific object of the present invention is to produce frozen food products with increased shelf life by providing more effective cryogenic pasteurization.

Another specific object of the present invention is to provide an enhanced freezer system which reduces "twinning," i.e., the freezing together of food products, to produce aesthetically pleasing frozen food products.

In accordance with the present invention, a freezer system is disclosed which first conductively and rapidly freezes at least one surface of the food product to a predetermined depth, less than the entire thickness of the product, by direct supportive contact with a refrigerated surface, and which secondly convectively completes the freezing process by conveying the product through a refrigerated enclosed space. Preferably, for space/freezing efficiency purposes, supportive contact freezing is achieved by contacting the food product with the conductive outer surface of a rotating contact freezer, such as a drum/wheel freezer, wherein the food product will preferably stick or adhere to such outer surface following contact. Even more preferably, a first side of the food product is crust frozen to a predetermined depth by supportive contact with an outer surface of a first rotating contact freezer, and a second opposing side of the food product is then crust frozen to a predetermined depth by supportive contact with an outer surface of a second rotating contact freezer. Such predetermined depths are preferably at least about 1/32 of an inch, and even more preferably, between about 1/32 of an inch and about ⅛ of an inch (e.g., for meat product applications such as hamburger patties). The side edges of the food product are also at least partially, and preferably entirely, crust frozen during contact freezing. Complete freezing is preferably achieved by directly conveying partially frozen products from the contact freezer(s) to a convection freezer within which the food products follow an ascending or descending path defined by multiple, stacked layers of a continuous conveyor means (e.g., as found in spiral freezer systems), so as to achieve a high dwell time in relation to attendant space utilization. Complete freezing of partially frozen food products can also be accomplished by conveying the partially frozen food products along a conveyor means within a convective tunnel freezer system.

Preferably, contact freezing is carried out in an enclosure to reduce contamination from external sources. Further, for many applications (e.g., hydrophobic products such as hamburger patties or mechanically deboned meat having a relatively high fat content), in order to enhance adherement of the food product to the contact freezer surface, it is desirable to inhibit high humidity air from entering the enclosure by using plastic curtains. In this regard, it is preferable to maintain the dew point within the enclosure at below about 25°

F. and, even more preferably, below about 10° F. This is particularly desirable, of course, when rotating contact freezers are utilized. Relatedly, it is preferable to cool the contact freezing enclosure.

In one embodiment of the present invention, the freezer system includes two immediately adjacent, counter-rotating contact freezers positioned within a common enclosure, as described above, means corresponding with each contact freezer for removing partially frozen food products from the outer surfaces thereof, a convection freezer and a means for transferring partially frozen food products from the rotating contact freezers to the convection freezer. Upon introduction of the food product to the first rotating contact freezer, a first side thereof is rapidly crust frozen to a predetermined depth by contacting the outer surface of the freezer during about $\frac{1}{2}$ to $\frac{3}{4}$ of a single rotation. Then first removal means, such as a stationary doctor knife positioned adjacent to the first contact freezer, removes the crust frozen food product from the outer surface thereof. Due to the positioning of such removal means and the first and second rotating contact freezers, the partially frozen food product is then directly introduced onto the second rotating contact freezer and a second side thereof is rapidly crust frozen to a predetermined depth by contacting the outer surface of the freezer during about $\frac{1}{2}$ to $\frac{3}{4}$ of a single rotation. A removal means, such as a stationary doctor knife positioned adjacent to the second contact freezer, then removes the frozen food product from the outer surface of the second freezer thereof. A transfer means, such as a conveyor, gravity slide and/or chute, then delivers the partially frozen food product to the enclosed convection freezer where complete freezing of the food product occurs more gradually as the food product is conveyed therethrough.

In the described embodiment, the convection freezer, such as a spiral freezer, uses a continuous cold air flow within the enclosure to freeze the partially frozen food product completely, i.e., substantially throughout the thickness of the food product. Food products are transported, for example, on an open-mesh conveyor belt which spirals upwardly within the enclosure.

Partial, or crust, freezing the food product to a predetermined depth with supportive rotating contact freezers prior to complete freezing in an enclosed convection freezer results in increased production rates of a higher quality frozen food product. Crust freezing of the food product in the desired manner reliably inhibits "twinning" of the food products, which results not only in aesthetically pleasing food products, but also dramatically increases freezer production rates because belt loading within the convection freezer can be significantly increased. Crust freezing the food products in the desired manner also decreases the required dwell time in the convection freezer to completely freeze the food product, thereby increasing throughput. The decrease in dwell time also decreases the effects of dehydration. As a result, a more tender food product with less shrinkage is realized. Crust freezing the food product in accordance with the present invention also results in a final food product having an increased shelf life. In short, it is believed that freezing food products in accordance with the present invention can increase production rates by two to four times over conventional freezers while producing higher quality, individually quick frozen food products that are more easily packed and exhibit less breakage.

Moreover, the present invention presents less space and facility requirements, few additional safety considerations, low cost and maintenance advantages, and existing facilities can be readily retrofitted to implement the same.

While the present invention has particular applicability for frozen meat products such as hamburger patties, etc., those skilled in the art will appreciate numerous other applications.

DETAILED DESCRIPTION

Figure 1:
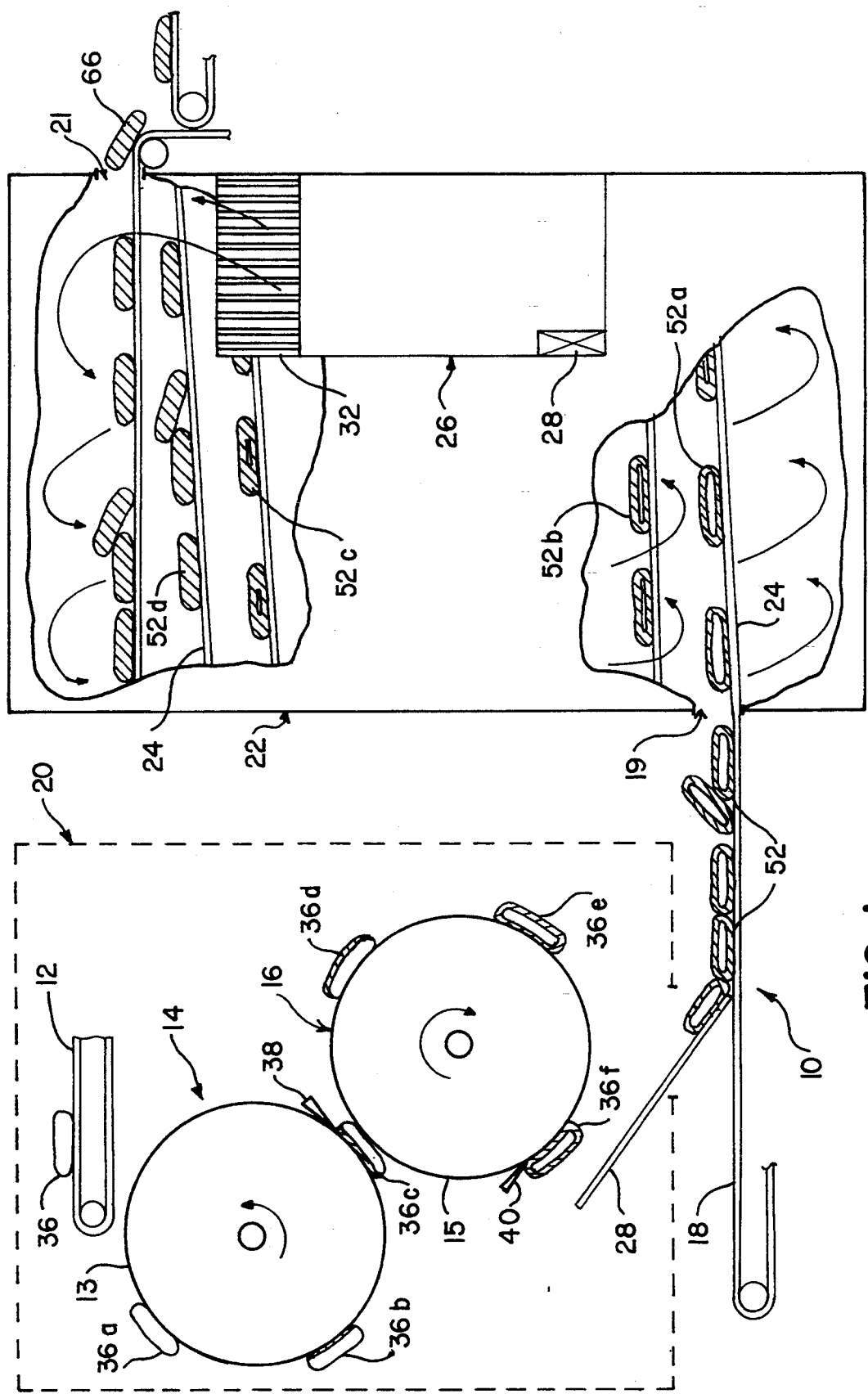
FIG. 1 illustrates a freezer system according to an embodiment of the present invention.

Referring now to the drawings, FIG. 1 illustrates a cross-sectional end view of a freezer system 10 according to one embodiment of the invention. Generally, the freezer system 10 includes first and second rotating contact freezers 14, 16 upon which food products 36 (e.g., hamburger patties) are supportively contacted by respective outer surfaces 13, 15 for rapid, conductive crust freezing. Both sides the food products 36 rapidly freeze to predetermined depths such that the food products 36 are partially frozen. In addition, the rotating contact freezers 14, 16 at least partially freeze the edges of the food products 36. After partial freezing, the food products 52 slide down gravity chute 28 to a conveyer 18 which introduces the food product into an enclosed convection freezer 22. Such enclosed freezers can include spiral freezers having a stacked or cascading conveyor configuration. Upon entry, a continuous cold air flow circulates about the food products 52 to convectively complete the freezing process as the food products 52 are conveyed along continuous spiraling conveyor means 24.

As noted, the food products 36 are initially crust frozen by sequentially contacting first and second sides of the food products 36 with the outer surfaces of the rotating contact freezers 14, 16. More specifically, food products 36 are vertically introduced to outer surface 13 of the first rotating contact freezer 14 by belt conveyor 12 such that a first side of each food product 36 can adhere to the outer surface 13. Rotating contact freezers 14, 16 may be of the drum/wheel type having a cylindrical outer surface which rotates about a center axis. In order to rapidly freeze a food product, rotating contact freezers generally contain a refrigerant which is circulated on the inside of the conductive material defining the outer surface. Examples of such rotating contact freezers are disclosed in U.S. Pat. No. 5,199,279, "Drum Contact Freezer System and Method," and U.S. Pat. No. 5,187,947, "Wheel Type Freezer and Method for Rapid, Low Temperature Freezing," which patents are hereby incorporated by reference.

As the food product 36 rotates with the cold outer surface 13 about $\frac{1}{2}$ to $\frac{3}{4}$ rotation of the first rotating contact freezer 14, the first side of the food product 36 rapidly freezes to a first predetermined depth and the edges of the food product 36 partially freeze as progressively illustrated by 36a, 36b and 36c. A device, such as a doctor knife 38, then removes the partially frozen food products 36 from the outer surface 13, and introduces the second side of food products 36 into contact with the outer surface 15 of the second rotating contact freezer 16.

Second rotating contact freezer 16 rotates in the opposite direction to that of contact freezer 14, and food products 36 are transferred therebetween such that the second side of food products 36 adheres to outer surface 15 when contacted therewith. As the partially frozen food products 36 rotate on the outer surface 15 about ½ to ¾ rotation the second rotating contact freezer 16, the second side of the food product rapidly freezes to a second predetermined depth, as illustrated by 36d, 36e and 36f. A second doctor knife 40 then removes the crust frozen food products 52 from the outer surface 15 of the second rotating contact freezer 16. After removal, the crust frozen food products 52 slide down chute 28 to a conveyor belt 18 (e.g., open mesh). The conveyor 18 then carries the crust frozen food product 52 through an entrance 19 of an enclosed convection freezer system 22 for complete freezing.

Preferably, the convection freezer 22 contains a continuous, upwardly spiraling conveyor 24 (e.g., open mesh) which is integral with conveyor 18 as illustrated. As the food product moves along the conveyor 24, a cold air flow continuously flows over and/or across food products as illustrated, completely freezing the food products 52 by the time the products reach the end of conveyor 24 as illustrated by 52a, 52b, 52c and 52d. The completely frozen food products 66, then exit the convection freezer 22. Enclosed spiral freezers that may be employed in the present invention include the GYRoCOMPACT M76, available from Frigoscandia Food Process Systems.

Enclosed convection freezers can include an evaporator 26 and a fan 28, as illustrated, which cools and recirculates the air within the enclosed spiral freezer 22. In one embodiment, the cold air flows from the upper section of the enclosed spiral freezer 22 and across and/or downwardly over food products 52, freezing the food products 52 as they travel upwardly along the conveyer 24. As the cool air approaches the lower section of the convection freezer 22, a fan 28 draws the air into an evaporator system 26 for cooling and recirculation. The evaporator generally uses an ammonia or halocarbon refrigerant contained in the coil 32.

Preferably, a low humidity-enclosure 20 is provided around the rotating contact freezers 14, 16 to reduce contamination and inhibit ice formation on the outer surfaces 13, 15 of the rotating contact freezers 14, 16. Additionally, air curtains can be positioned at the entrance 19 and the exit 21 of the enclosed spiral freezer 22 to inhibit contamination from external sources, decreases in the heat transfer rate and frost build-up within the enclosed spiral freezer 22.

Figure 2:
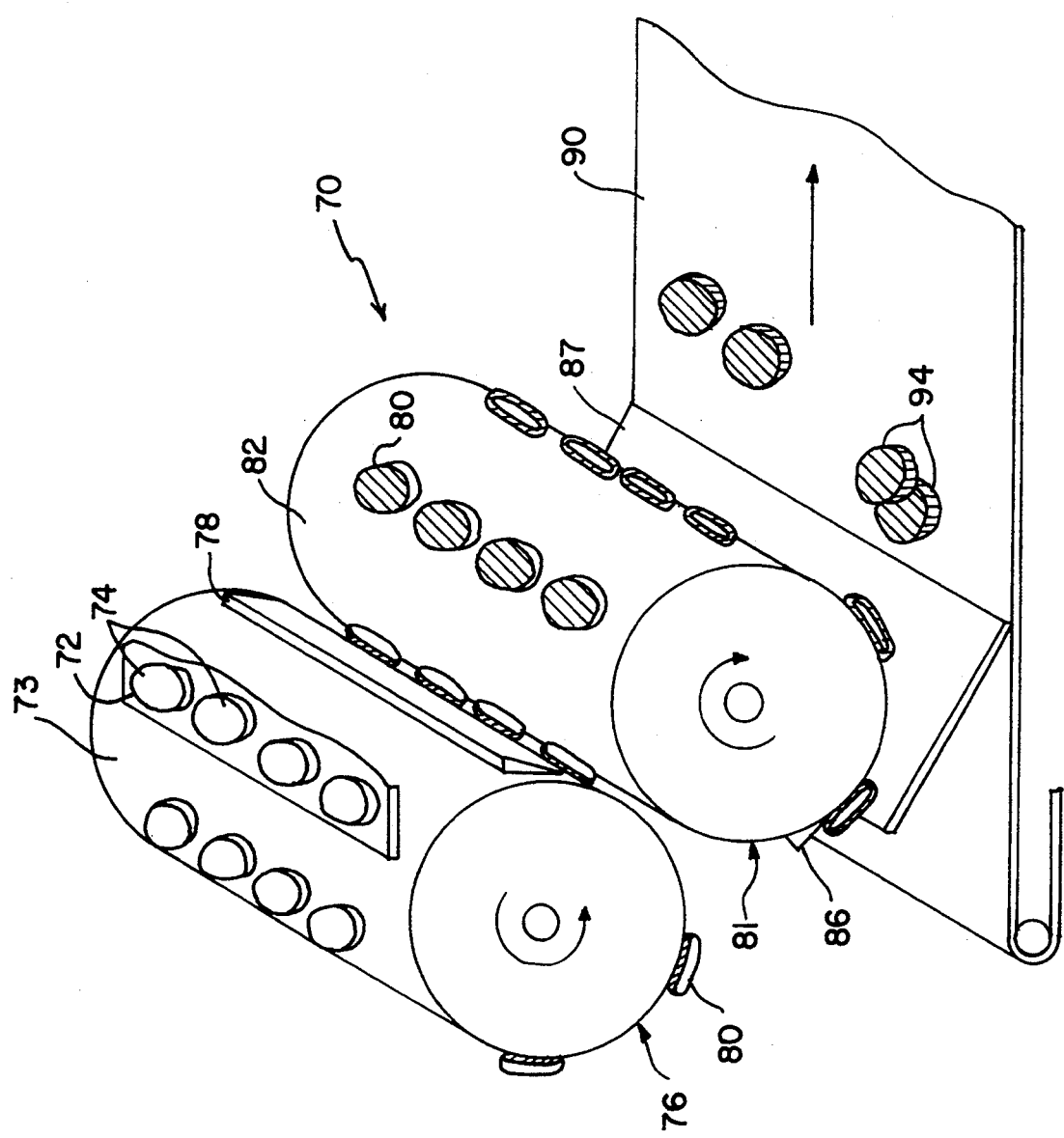
FIG. 2 illustrates a perspective view of rotating contact freezers as food products partially freeze according to an embodiment of the present invention.

FIG. 2 illustrates a perspective view of numerous food products as the food products are partially frozen by the rotating contact freezers 76, 81. The food products 74 are spread across the width of a conveyor belt 72 such that when introduced and placed in contact with the outer surface 73 of a rotating contact freezer 76, the food products are spread across a portion of the rotating contact freezer 76. As the food products rotate with the outer surface 73 of the rotating contact freezer 76, the food products rapidly freeze to a first predetermined depth. A doctor knife 78 then removes partially frozen food products 80 from the outer surface 73 and transfers them to the outer surface 82 of a rotating contact freezer 81. The partially frozen food products 80 are positioned substantially across a portion of the outer surface 82 and stick to the outer surface 82 until removed by a doctor knife 86.

Preferably, a chute or slide 87 transfers the relatively hard crust frozen food products to the outer extending portion 90 of the enclosed convection freezer conveyer belt. As shown in FIG. 2, the partially frozen food products 94 may contact each other after sliding down the chute 87 and settling onto the conveyer belt 90. However, since the top and bottom surfaces of the partially frozen food products 94 are frozen to predetermined depths, and the edges of the food products 94 are partially frozen, the food products will not freeze together or "twin" as they travel through the enclosed convection freezer. In this regard, increased production of aesthetically pleasing frozen food products results because crust freezing the food products enables the food products to be placed in closer proximity to each other, thereby increasing the number of food products being frozen.

Figure 3:
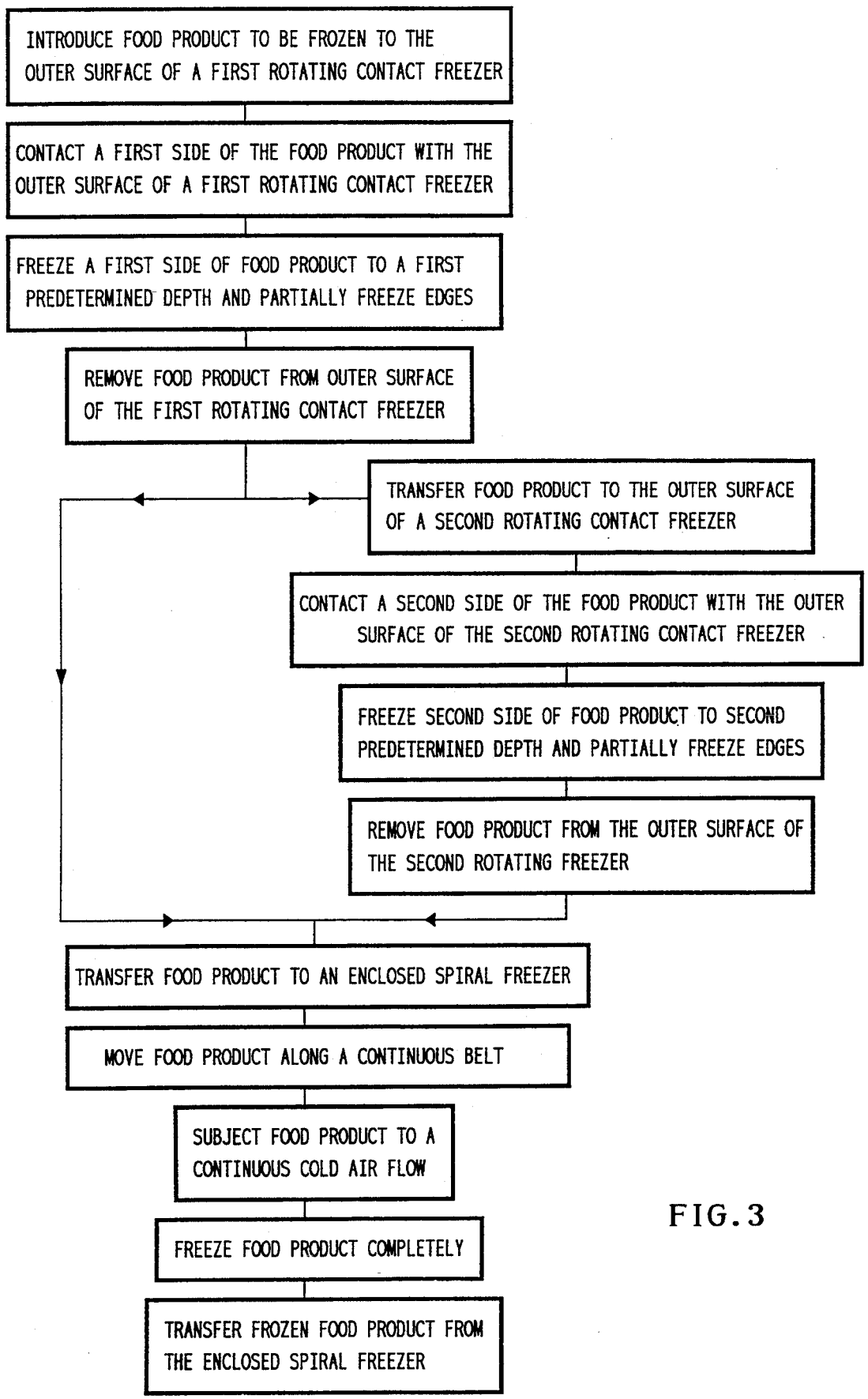
FIG. 3 illustrates the method of freezing food products according to embodiments of the present invention.

The flow chart illustrated in FIG. 3 traces two embodiments of this freezing process. In one embodiment, the food product is introduced to a first rotating contact freezer system. A first side of the food product contacts the outer surface of a first rotating contact freezer. As the food products rotate with this outer surface, the first side of the food product freezes to a first predetermined depth. Additionally, the edges of the food product are partially frozen or cooled as the food product rotates with the outer surface of the first rotating contact freezer. Once a first side of the food product freezes to a first predetermined depth, the partially frozen food product is removed from the outer surface of the first rotating contact freezer. The food product is then transferred to an enclosed spiral freezer system where the food product moves along a spiraling conveyer belt and is subjected to a continuous flow of cold air. The food product freezes completely, or substantially through its depth as it moves along the conveyer belt. The now frozen food product is then transferred from the enclosed spiral freezer system.

FIG. 3 illustrates a second embodiment of the freezing process. In this embodiment, a second side of the food product freezes after removal from the outer surface of the first rotating contact freezer and before transfer to the enclosed spiral freezer system.

What is claimed is:

1. A method of freezing a food product, comprising the steps of:

supportively contacting a first side of said food product substantially across the entire surface of said first side with the outer surface of a first rotating supportive contact freezer;

circulating a refrigerant within said first rotating supportive contact freezer to cool said outer surface of said first rotating supportive contact freezer;

maintaining said supportive contact substantially across said entire surface of said first side of said food product to crust freeze said food product substantially uniformly across said entire surface of said first side to a first predetermined depth by substantially uniform conductive heat transfer from said entire surface of said first side of said food product through said outer surface of said first rotating supportive contact freezer to said circulated refrigerant within said first rotating supportive contact freezer;

removing said food product from said outer surface of said first rotating supportive contact freezer;

transferring said food product to a convection freezer;

moving said food product within said convection freezer along a belt means;

subjecting said food product to a cold air flow within said convection freezer to substantially complete freezing of said food product.

2. The process of claim 1, wherein said food product maintains said supportive contact substantially across said entire surface of said first side with said outer surface of said first rotating supportive contact freezer until said first side of said food product substantially uniformly freezes substantially across said entire surface of said first side to a depth of at least about 1/32 of an inch.

3. The process of claim 1, wherein said food product maintains supportive contact substantially across said entire surface of said first side with said outer surface of said first rotating supportive contact freezer until said first side of said food product substantially uniformly freezes substantially across said entire surface of said first side to a depth of between about 1/32 of an inch to about ¼ of an inch.

4. The process of claim 1, further comprising the steps of:

transferring said food product from said first rotating supportive contact freezer to the outer surface of a second rotating supportive contact freezer;

supportively contacting a second side of said food product substantially across the entire surface of said second side with said outer surface of said second rotating supportive contact freezer;

circulating a refrigerant within said second rotating supportive contact freezer to cool said outer surface of said second rotating supportive contact freezer;

maintaining said supportive contact substantially across said entire surface of said second side of said food product to crust freeze said food product substantially uniformly across said entire surface of said second side to a second predetermined depth by substantially uniform conductive heat transfer from said entire surface of said second side of said food product through said outer surface of said second rotating supportive contact freezer to said circulated refrigerant within said second rotating supportive contact freezer; and removing said food product from said outer surface of said second rotating supportive contact freezer.

5. The process of claim 4, wherein said food product maintains supportive contact substantially across said entire surface of said second side with said outer surface of said second rotating supportive contact freezer until said second side of said food product substantially uniformly freezes substantially across said entire surface of said second side to a depth of at least about 1/32 of an inch.

6. The process of claim 4, wherein said food product maintains supportive contact substantially across said entire surface of said second side with said outer surface of said second rotating supportive contact freezer until said second side of said food product substantially uniformly freezes substantially across said entire surface of said second side to a depth of between about 1/32 of an inch to about ¼ of an inch.

7. An apparatus for freezing food products, comprising:

a first rotating supportive contact freezer means for supportively contacting a first side of a food product substantially across the entire surface of said entire first side with the outer surface of said first rotating supportive contact freezer means, wherein said first side of said food product is frozen substantially uniformly across said surface of said first side to a first predetermined depth, wherein the edges of said food product are partially frozen, wherein said first rotating supportive contact freezer means contains a circulated refrigerant to cool said outer surface of said first rotating supportive contact freezer means, and wherein said first side is frozen by substantially uniform conductive heat transfer from said entire surface of said first side through said outer surface of said first rotating supportive contact freezer means to said circulated refrigerant contained in said first rotating supportive contact freezer;

convection freezer means for complete freezing of said food product, wherein said food product is frozen by convective heat transfer as said food product is conveyed along a belt means within said convection freezer means, and wherein, as said food product is conveyed along said belt means, a cold air flow within said convection freezer means substantially continuously contacts said food product to freeze said food product completely.

8. The apparatus as claimed in claim 7, wherein said first side of said food product is frozen substantially uniformly across said surface of said first side and said first predetermined depth is between about 1/32 of an inch and about ¼ of an inch.

9. The apparatus as claimed in claim 7, wherein said first side of said food product is frozen substantially uniformly across said surface of said first side and said first predetermined depth is at least about 1/32 of an inch.

10. The apparatus as claimed in claim 7, further comprising:

an enclosure positioned about said first rotating supportive contact freezer means and within which the dew point is maintained below about 25° F.

11. An apparatus as claimed in claim 7, wherein said belt means is a continuous spiralling stacked belt.

12. An apparatus as claimed in claim 7, wherein said belt means includes a series of cascading belts.

13. The apparatus as claimed in claim 7, further comprising:

a second rotating supportive contact freezer means for supportively contacting a second side of said food product substantially uniformly across the entire surface of said second side with the outer surface of said second rotating supportive contact freezer means, wherein said second side of said food product is frozen substantially uniformly across said surface of said second side to a second predetermined depth, wherein the edges of said food product are partially frozen, wherein said second rotating supportive contact freezer means contains a circulated refrigerant to cool said outer surface of said second rotating supportive contact freezer means, and wherein said second side is frozen by substantially uniform conductive heat transfer from said second side through said outer surface of said second rotating supportive contact freezer means to said circulated refrigerant contained in said second rotating supportive contact freezer.

14. The apparatus as claimed in claim 13, wherein said first and second side of said food product are frozen substantially uniformly across said surface of said first and second side, respectively, wherein said first and second predetermined depths are each between about 1/32 of an inch and about ¼ of an inch, and wherein said first predetermined depth is substantially equal to said second predetermined depth.

15. A method of freezing a food product, comprising the steps of:

supportively contacting a first side of said food product substantially across the entire surface of said first side with the outer surface of a first rotating supportive contact freezer;

circulating a refrigerant within said first rotating supportive contact freezer to cool said outer surface of said first rotating supportive contact freezer;

maintaining said supportive contact substantially across said surface of said first side to crust freeze said food product substantially uniformly across said surface of said first side to a first predetermined depth by conductive heat transfer from said first side of said food product through said outer surface of said first rotating supportive contact freezer to said refrigerant within said first rotating supportive contact freezer;

removing said food product from said outer surface of said first rotating supportive contact freezer;

transferring said food product from said first rotating supportive contact freezer to the outer surface of a second rotating supportive contact freezer;

supportively contacting a second side of said food product substantially across the entire surface of said second side with said outer surface of said second rotating supportive contact freezer;

circulating a refrigerant within said second rotating supportive contact freezer to cool said outer surface of said second rotating supportive contact freezer;

maintaining said supportive contact substantially across said surface of said second side to crust freeze said food product substantially uniformly across said surface of said second side to a second predetermined depth by conductive heat transfer from said second side of said food product through said outer surface of said second rotating supportive contact freezer to said refrigerant within said second rotating supportive contact freezer;

removing said food product from said outer surface of said second rotating supportive contact freezer;

transferring said food product to a convection freezer;

moving said food product within said convection freezer along a belt means;

subjecting said food product to a cold air flow within said convection freezer to substantially complete freezing of said food product.

* * * * *